C. W. KELSEY.
REAR AXLE CONSTRUCTION FOR MOTOR VEHICLES.
APPLICATION FILED OCT. 29, 1914.
1,219,006.
Patented Mar. 13, 1917.
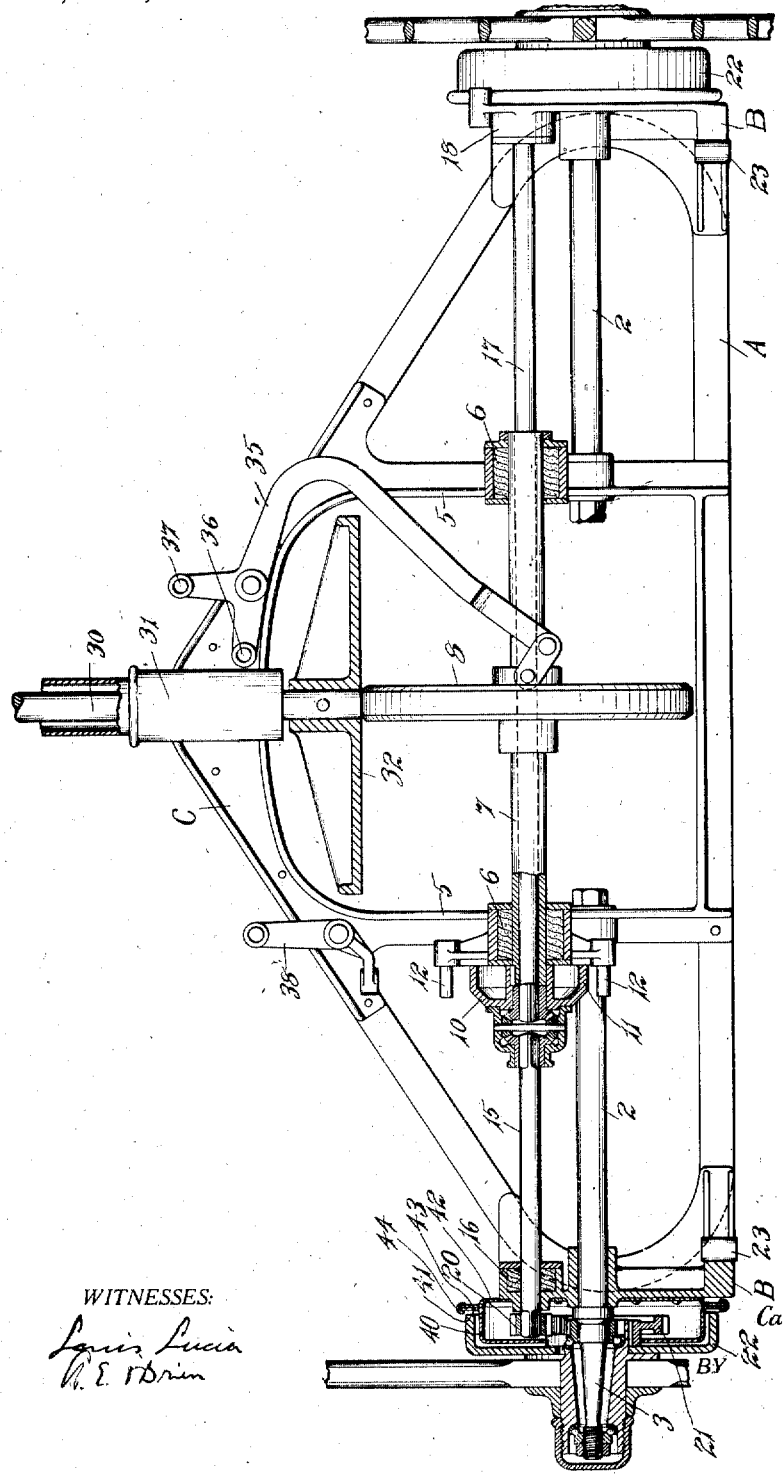
WITNESSES:
INVENTOR.
Cadwallader W. Kelsey:
BY
ATTORNEY.

UNITED STATES PATENT OFFICE.

CADWALLADER W. KELSEY, OF HARTFORD, CONNECTICUT.

REAR-AXLE CONSTRUCTION FOR MOTOR-VEHICLES.

1,219,006.   Specification of Letters Patent.   Patented Mar. 13, 1917.

Application filed October 29, 1914. Serial No. 869,214.

*To all whom it may concern:*

Be it known that I, CADWALLADER W. KELSEY, a citizen of the United States, and a resident of Hartford, in the county of Hartford and State of Connecticut, have invented certain new and useful Improvements in Rear-Axle Construction for Motor-Vehicles, of which the following is a specification.

This invention relates particularly to a novel rear axle construction for motor vehicles, particularly adapted for a friction drive. One of the essential features of the construction is that this complete rear axle structure constitutes the support for the complete friction driving mechanism, and is so constructed and arranged that there is a direct shaft drive from the motor to the rear wheels through the friction gearing.

The drawing represents in plan view an embodiment of the invention.

Referring to the drawing, the complete rear axle structure comprises a frame A which is formed of angle iron bent to what is substantially a triangular shape, having secured to each end thereof a bracket B, and centrally thereof, a bracket C; 2, 2, are spindles or shafts mounted in suitable supports in the brackets B, C, and upon the ends 3 of which the wheels are mounted. The spindles in the embodiment illustrated are stationary, and the wheels are rotatably mounted on them. In the cross arms, 5, 5, of the bracket C are mounted bearings 6, 6, in which rotates a tubular shaft 7, upon which there is slidingly mounted the friction wheel 8 which is fastened to the shaft 7 so as to turn with it. An end of this shaft 7 is keyed to the differential housing 10 which has an enlargement 11 to form a brake drum upon which a brake (not shown), hung on the pins 12, is adapted to engage. The differential may be of usual construction, and one of the gears is connected with the shaft 15 which has a bearing 16 in the bracket B, and the other to the shaft 17 which has a bearing for its outer end at 18 in the bracket B. To the ends of these shafts 15, 17, are secured pinions 20, which mesh with gears 21 on the wheel hub. 22, 22, are brake drums fast to the wheel hub. 23, 23, indicate fastening lugs for the ends of a spring which at its center is connected with the vehicle body. 30 is the main driving shaft from the motor supported in the bearing 31 on the bracket C, and carrying at its end the friction disk 32, against which the friction wheel 8 bears and by means of which it is driven, and through it the shafts 15, 17, to drive the wheels.

It is of course to be understood that proper provisions are made for shifting the friction disk 32 into and out of engagement with the friction wheel, and also for sliding the friction wheel along its shaft to change the driving speed, the lever 35 being provided for this latter purpose connected by suitable mechanism at the point 36, the arm 37 of this lever being connected with one end of the crank 38, the other end of which is connected with the brake supported on the pins 12 and engaging the drum on the differential housing. This is merely one way in which the connections can be hooked up, and which, as will be seen, provide that the brake on the differential housing is applied only after movement of the friction wheel has been effected.

From a consideration of the drawing and the foregoing description it will be evident that the friction drive mechanism and its connections with the wheels are wholly supported by this complete rear axle structure; that the mode of delivering power from the friction wheel to the vehicle wheels is such that it is possible to keep the sizes of the friction wheel and disk down where they can be conveniently and practically assembled and supported on the rear axle, and that this arrangement provides for a direct shaft drive for the friction disk, thus eliminating the usual intermediate shaft, and the chain drive therefrom to the rear wheels, which is common practice in the present friction drive constructions for motor vehicle work.

An additional feature of novelty and utility resides in the provision of a properly guarded oil bath in which the gear and pinion operate. I form an oil case by cupping up a member 40 which fits within the brake drum 22, and has a flat edge flange 41. A cover for this casing, indicated at 42, is secured to the bracket B in any convenient way, as by rivets, and has a flange 43. A binding strip 44 fits over the edges of these abutting flanges, and is securely crimped down to hold the two flanges together. The oil is forced into this casing. The only place of escape is around the wheel hub, and the centrifugal force tends to throw the oil away from this point, with the result that a substantially oil-tight casing is thus provided.

I claim as my invention:

1. In a device of the character described, a rear axle frame, wheel shafts and supports therefor mounted on said frame, traction wheels mounted on said shafts; a friction wheel shaft parallel to said traction wheel shafts and supports therefor on said frame in fixed relation to the support of said traction wheel shafts; reduction gearing between said friction wheel shaft and said traction wheels; a friction wheel keyed to and slidingly mounted upon its shaft; a propeller shaft supported at its rear end in said frame, a friction disk mounted on said shaft, means for moving said disk into and out of engagement with said friction wheel; and differential mechanism located between said traction wheels.

2. In a device of the character described, a rigid rear axle frame, axially alined shafts and fixed bearings therefor on said frame, a differential mechanism located between the adjacent ends of said alined shafts, a member of said differential mechanism being connected with each shaft; a friction wheel, a shaft to which it is keyed and on which it is slidingly mounted, fixed bearings for said shaft on said frame, said shaft being coupled to said differential mechanism; wheel shafts parallel to said alined shafts and fixed bearings therefor on said frame; wheels on said shafts; reduction gearing between said alined shafts and their corresponding wheels; a propeller shaft supported at its rear end in said frame, a friction disk mounted on said propeller shaft in operative relation with said wheel, and means for moving said disk into and out of engagement with said wheel.

3. In a device of the character described, a rigid rear axle frame, axially alined shafts and fixed bearings therefor on said frame; a differential mechanism located between the adjacent ends of said alined shafts, a member of said differential mechanism being connected with each shaft; a tubular shaft surrounding one of said alined shafts, fixed bearings therefor on said frame, said shaft being coupled to said differential mechanism, and a friction wheel keyed to and slidingly mounted upon said shaft, wheel shafts parallel to said alined shafts and fixed bearings therefor on said frame, wheels on said shafts, reduction gearing between said alined shafts and their corresponding wheels; a propeller shaft supported at its rear end in said frame, a friction disk mounted on said propeller shaft in operative relation with said wheel, and means for moving said disk into and out of engagement with said wheel.

4. A rear axle frame for motor vehicles, spindles separated from but supported at each end thereof, wheels rotatably mounted on said spindles, a differential mechanism carried by said frame, shafts mounted in said frame and connected with members of said differential mechanism, driving connections between said shafts and said wheels, a tubular shaft connected with the housing of said differential, a friction wheel mounted upon and slidable along said tubular shaft, and a friction disk supported on said axle and in operative relation with said friction wheel.

5. In a motor vehicle, a rear axle comprising a frame, a central integral bracket mounted on said frame, a propeller shaft supported at its rear end in a bearing in said bracket, a friction disk mounted at the end of said shaft, a second shaft arranged at right angles to the propeller shaft and supported in bearings in said bracket, a friction wheel slidingly mounted on said shaft and adapted for coöperation with said friction disk, propeller wheels mounted on said frame, geared connections between the last mentioned shaft and said propeller wheels and means for moving said friction disk into and out of engagement with said friction wheel.

CADWALLADER W. KELSEY.

Witnesses:
A. E. O'BRIEN,
H. E. HART.